United States Patent
Yamashita

(10) Patent No.: US 10,344,645 B2
(45) Date of Patent: Jul. 9, 2019

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yoshio Yamashita, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/860,982

(22) Filed: Jan. 3, 2018

(65) Prior Publication Data
US 2018/0216511 A1 Aug. 2, 2018

(30) Foreign Application Priority Data
Feb. 2, 2017 (JP) ................................ 2017-017354

(51) Int. Cl.
| | |
|---|---|
| F01N 3/027 | (2006.01) |
| F01N 3/20 | (2006.01) |
| F01N 3/035 | (2006.01) |
| F01N 9/00 | (2006.01) |
| F01N 3/023 | (2006.01) |

(52) U.S. Cl.
CPC ........... *F01N 3/2013* (2013.01); *F01N 3/027* (2013.01); *F01N 3/0235* (2013.01); *F01N 3/035* (2013.01); *F01N 9/002* (2013.01); *F01N 2240/36* (2013.01); *F01N 2430/00* (2013.01); *F01N 2900/1411* (2013.01); *F01N 2900/1606* (2013.01); *Y02T 10/47* (2013.01)

(58) Field of Classification Search
CPC ...... F01N 3/0235; F01N 3/0238; F01N 3/027; F01N 3/2093; F01N 2240/36
See application file for complete search history.

(56) References Cited

U.S. PATENT DOCUMENTS

| | | | | |
|---|---|---|---|---|
| 4,875,336 A | * | 10/1989 | Hayashi | ................ F01N 3/0233 60/286 |
| 5,930,995 A | * | 8/1999 | Watanabe | ................ F01N 3/021 55/DIG. 30 |

(Continued)

FOREIGN PATENT DOCUMENTS

| | | |
|---|---|---|
| JP | H05-44436 A | 2/1993 |
| JP | H07-279647 | 10/1995 |

(Continued)

*Primary Examiner* — Jonathan R Matthias
(74) *Attorney, Agent, or Firm* — Finnegan, Henderson, Farabow, Garrett & Dunner, LLP

(57) ABSTRACT

The disclosure is intended to oxidize PM deposited in a filter in a suitable manner. Provision is made for a filter of wall flow type, a temperature raising unit to raise the temperature of the filter from a downstream side thereof, an exhaust gas shut-off valve, and a controller. The controller controls a flow of exhaust gas in the filter by once fully closing the exhaust gas shut-off valve and then fully opening it when the flow rate of the exhaust gas is equal to or larger than a predetermined flow rate, so as to cause PM to move to a downstream side portion in the filter in the direction of flow of exhaust gas, and carries out regeneration processing which oxidizes the PM by using the temperature raising unit after the controller has caused the PM to move to the downstream side portion of the filter.

3 Claims, 8 Drawing Sheets

(56) References Cited

U.S. PATENT DOCUMENTS

| | | |
|---|---|---|
| 2002/0157384 A1 | 10/2002 | Hirota et al. |
| 2006/0156919 A1* | 7/2006 | Sellers .................... F01N 3/023 95/8 |
| 2007/0277515 A1 | 12/2007 | Igarashi |
| 2010/0269488 A1* | 10/2010 | Bailey .................. B01D 53/944 60/274 |
| 2011/0154808 A1* | 6/2011 | Hirata ................ B01D 53/9431 60/297 |
| 2014/0060008 A1 | 3/2014 | Dittler et al. |

FOREIGN PATENT DOCUMENTS

| | | |
|---|---|---|
| JP | 2006-183507 | 7/2006 |
| JP | 2008-115775 A | 5/2008 |
| WO | WO 01/73273 A1 | 10/2001 |
| WO | WO 2006/028163 A1 | 3/2006 |

* cited by examiner

[FIG. 1]
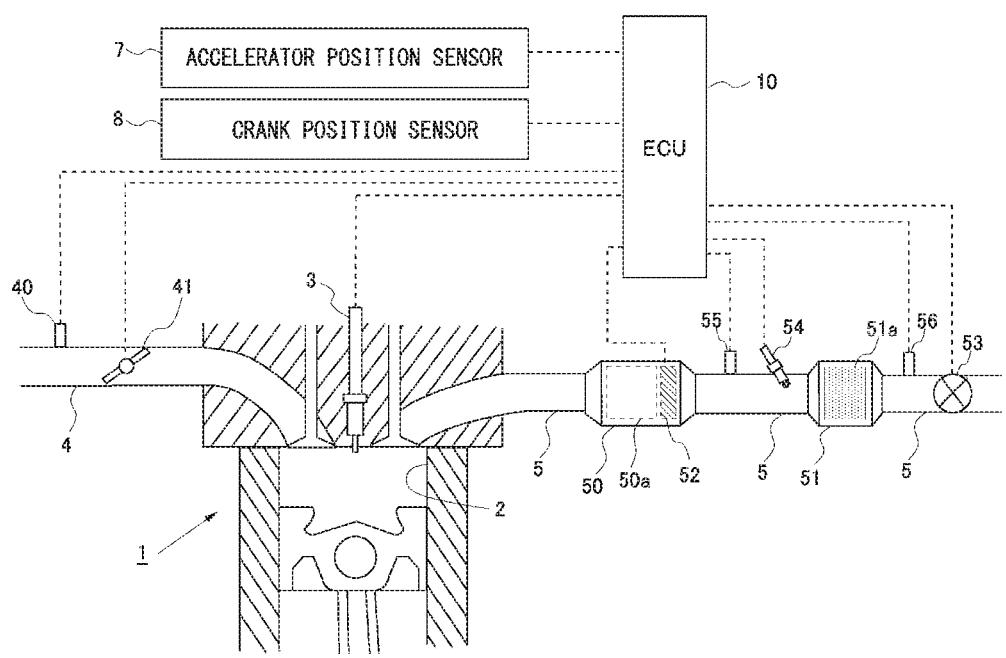

[FIG. 2]
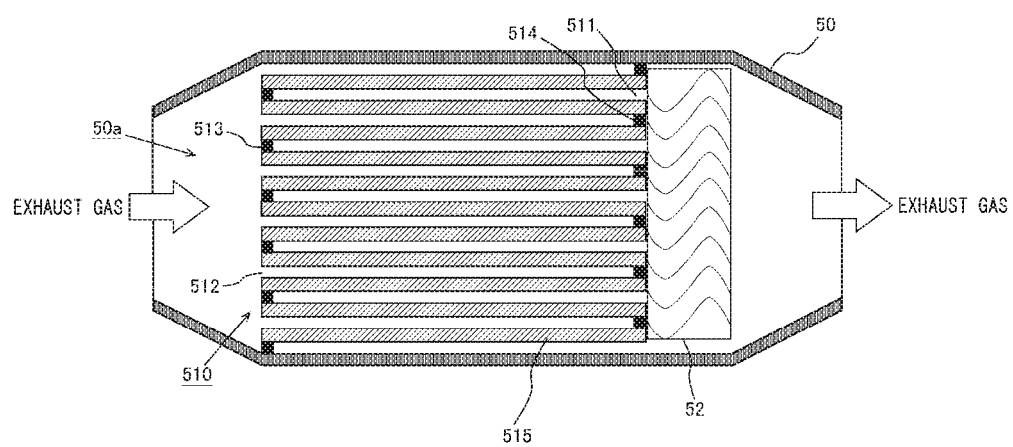
[FIG. 3]
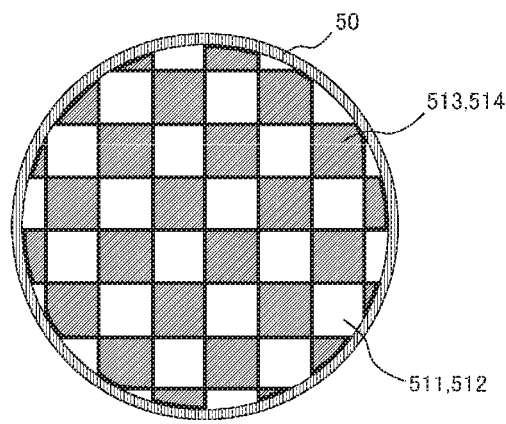

[FIG. 4]
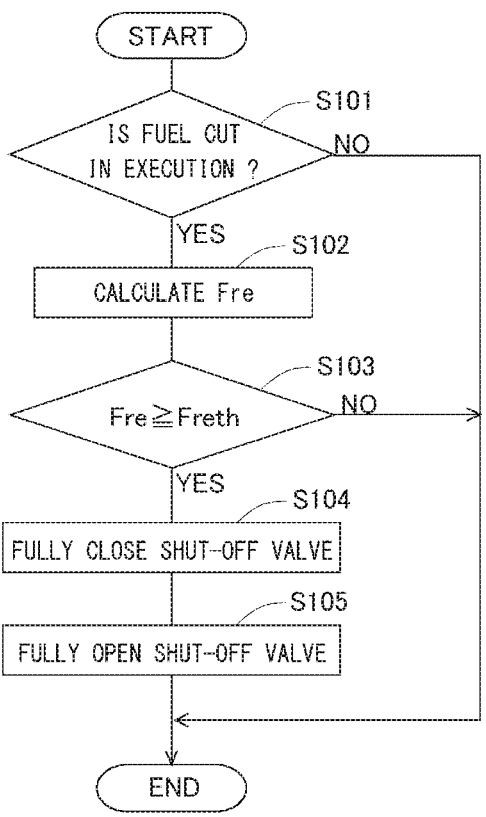
[FIG. 5A]
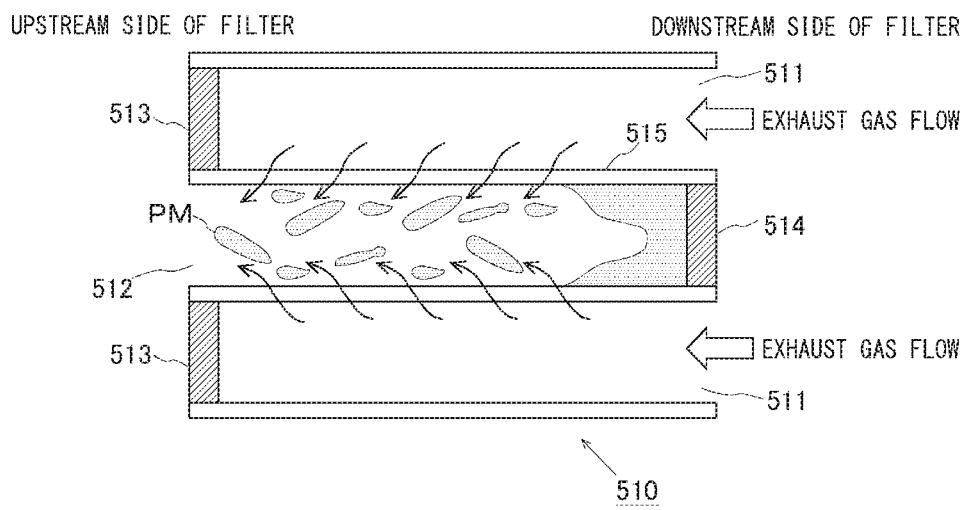

[FIG. 5B]
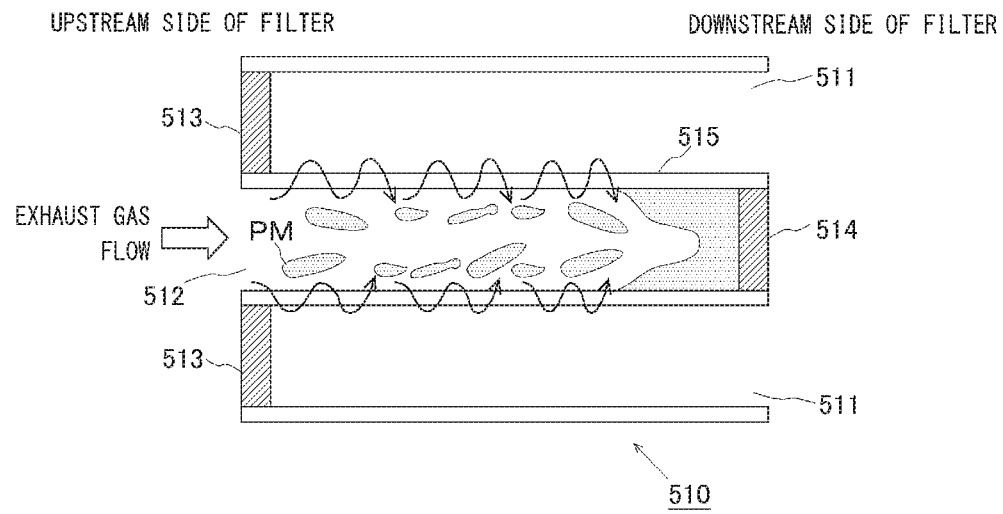
[FIG. 5C]
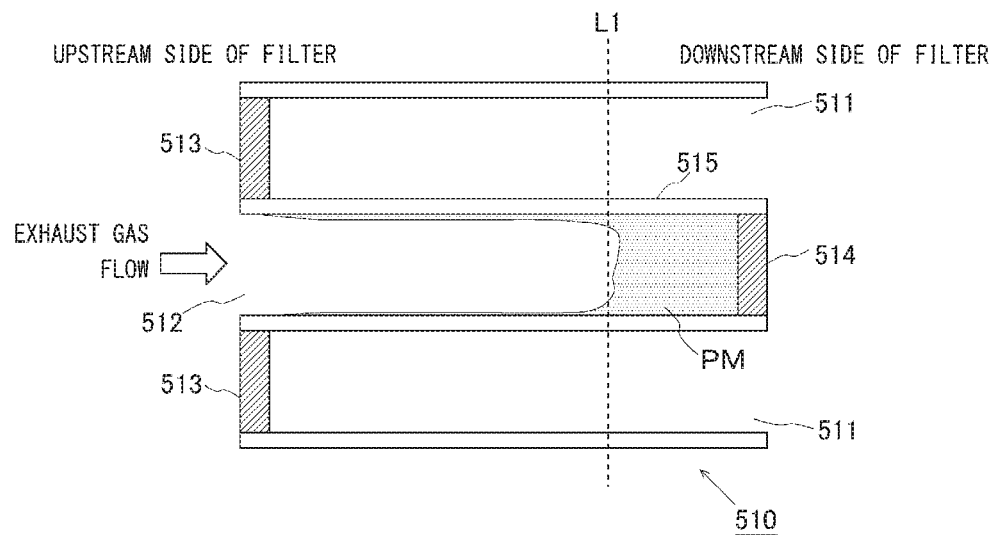

[FIG. 6]
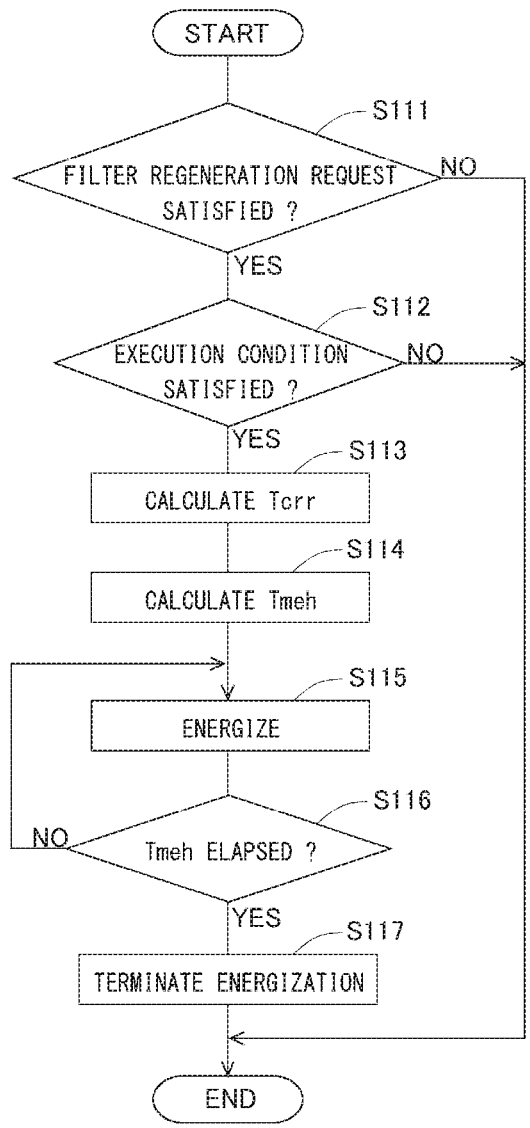

[FIG. 7]
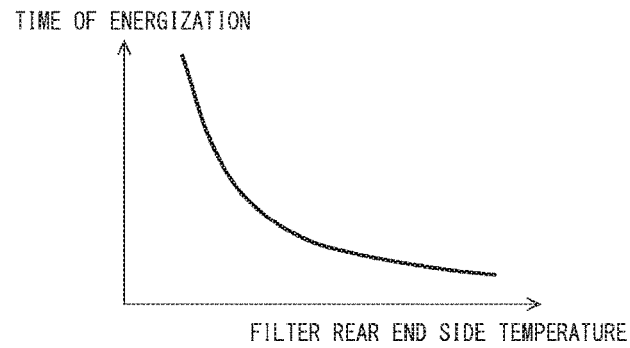
[FIG. 8]
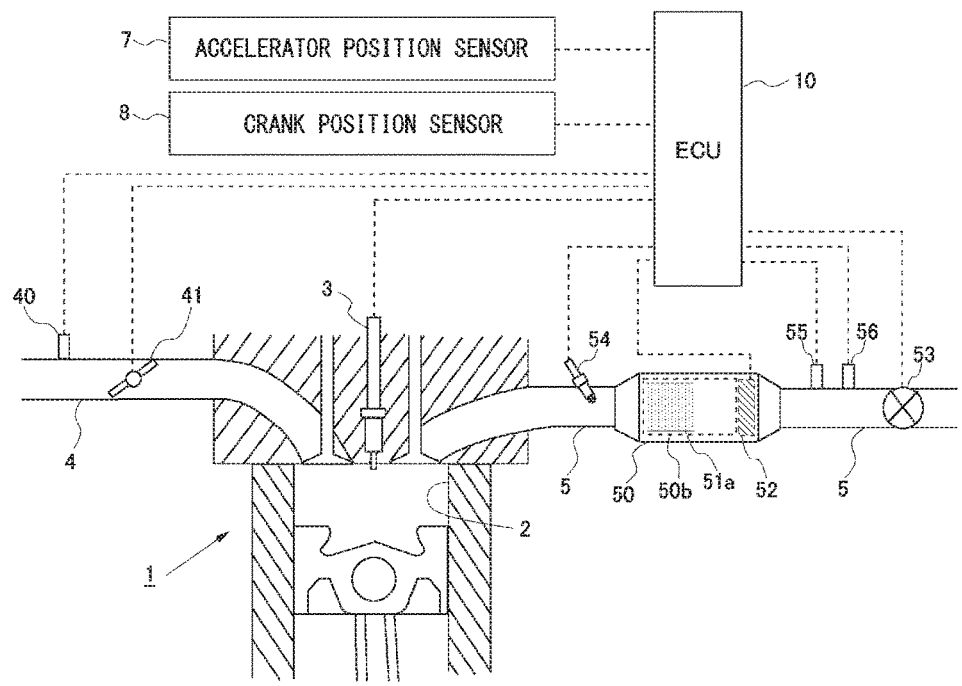

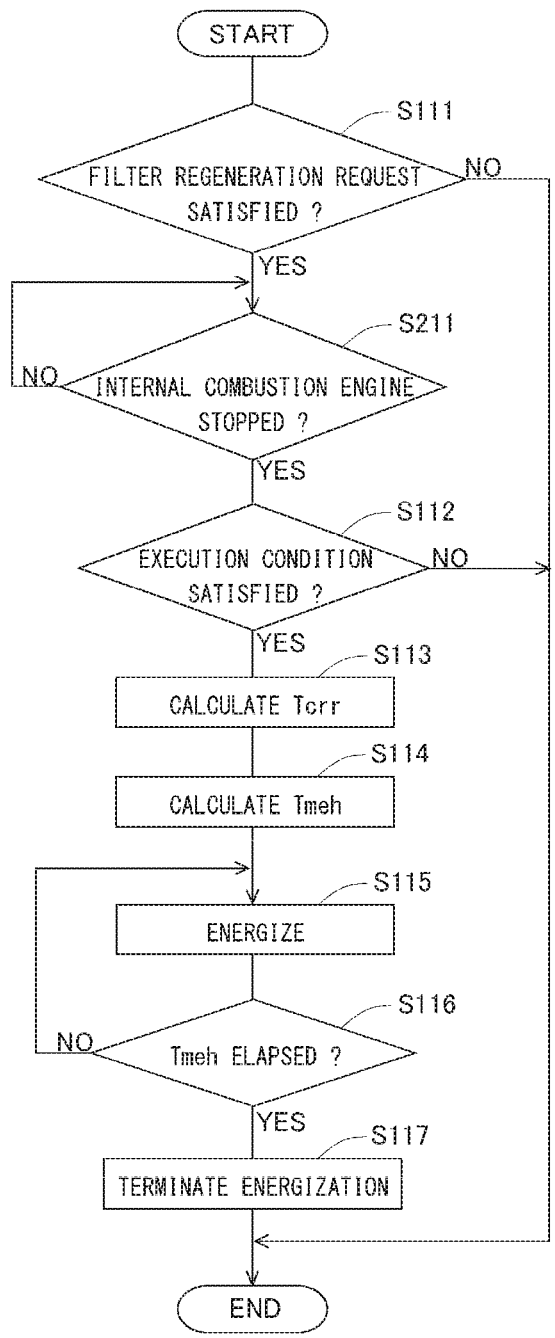
[FIG. 9]

[FIG. 10]
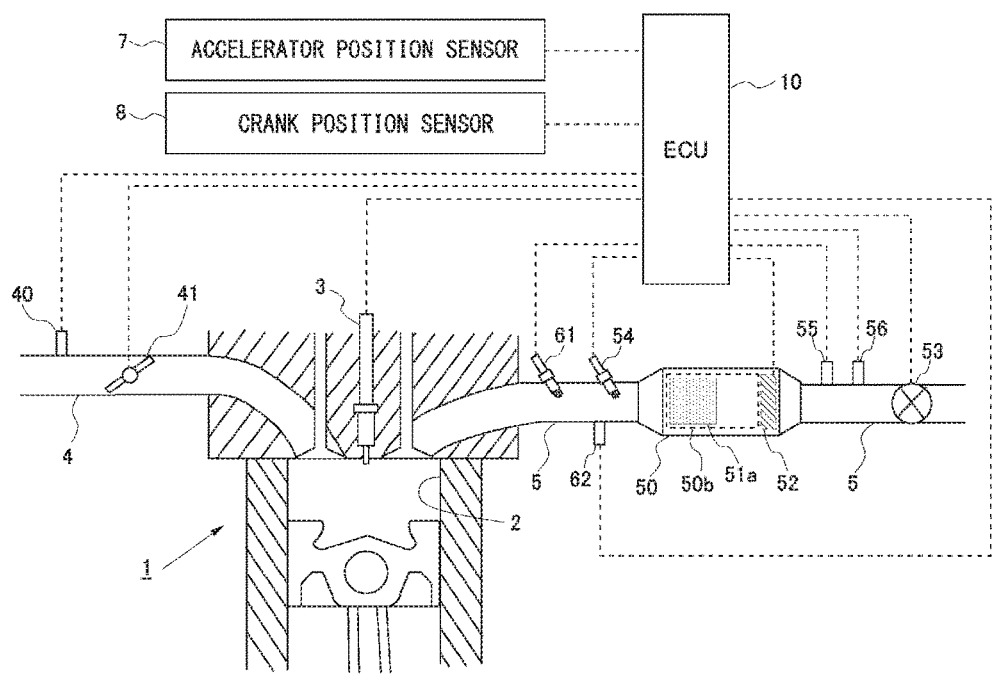

EXHAUST GAS PURIFICATION APPARATUS FOR INTERNAL COMBUSTION ENGINE

CROSS-REFERENCE TO RELATED APPLICATIONS

This application claims priority to Japanese Patent Application No. 2017-017354 filed on Feb. 2, 2017, the entire contents of which are incorporated by reference.

BACKGROUND

Technical Field

The present disclosure relates to an exhaust gas purification apparatus for an internal combustion engine.

Description of the Related Art

There has been known a technology in which a wall flow type filter for trapping particulate matter (hereinafter, also sometimes referred to as "PM") in exhaust gas is arranged in an exhaust passage of an internal combustion engine. In addition, in patent literature 1, there is disclosed a technology which raises the temperature of a wall flow type filter thereby to oxidize and remove the PM deposited in the filter.

CITATION LIST

Patent Literature

Patent Literature 1: Japanese Patent Application Laid-Open No. 2006-183507

SUMMARY

As the PM increasingly deposits in the wall flow type filter, the pressure loss of the filter will increase, so the regeneration of the filter is carried out by raising the temperature of the filter thereby to oxidize and remove the PM. Here, the PM tends to deposit in the filter from an upstream side portion to a downstream side portion thereof in the direction of flow of exhaust gas. Accordingly, in order to oxidize and remove the PM deposited in the filter, it is necessary to raise the temperature of the filter from its upstream side portion to its downstream side portion. In that case, a target for the temperature rise of the filter will extend over a wide area thereof, so the regeneration of the filter will require a large amount of energy.

The present disclosure has been made in view of the problems as referred to above, and the object of the disclosure is to oxidize and remove particulate matter deposited in a filter of wall flow type in a suitable manner.

Solution to Problem

The present disclosure resides in an exhaust gas purification apparatus for an internal combustion engine which is provided with a filter of wall flow type that is arranged in an exhaust passage of the internal combustion engine and has a plurality of cells divided by partition walls extending along the direction of flow of exhaust gas, said plurality of cells including first cells that each have a closed end portion at a downstream side in the direction of flow of exhaust gas and an open end portion at an upstream side in the direction of flow of exhaust gas, and second cells that each have a closed end portion at the upstream side in the direction of flow of exhaust gas and an open end portion at the downstream side in the direction of flow of exhaust gas, wherein said first and second cells are arranged in an alternate manner.

In such a filter, when the PM can be made to deposit intensively on a certain part of the filter, the regeneration of the filter can be carried out by raising the temperature of that part on which the PM has intensively deposited. In addition, in a portion of the filter in which the density of deposition of the PM is high, there is a more tendency for the PM to burn continuously at the time of the regeneration of the filter, than in a portion in which the density of deposition of the PM is low. That is, when the PM can be made to intensively deposit on the certain part of the filter, the regeneration of the filter can be carried out with a smaller amount of energy and in a shorter period of time by raising the temperature of that part of the filter on which the PM has intensively deposited, than when the temperature of the filter as a whole is raised.

Accordingly, the exhaust gas purification apparatus for an internal combustion engine according to the present disclosure further comprises: a temperature raising unit that is configured to raise the temperature of said filter from a downstream side thereof in the direction of flow of exhaust gas; an exhaust gas shut-off valve that is arranged in said exhaust passage at the downstream side of said filter and is constructed so as to be switched over between a fully opened state and a fully closed state; and a controller comprising at least one processor configured to: control a flow of exhaust gas in said filter by once fully closing said exhaust gas shut-off valve and then fully opening it, when a flow rate of the exhaust gas is equal to or larger than a predetermined flow rate, so that particulate matter deposited on said filter is caused to move to a downstream side portion in said filter in the direction of flow of exhaust gas; and carry out regeneration processing which oxidizes and removes the particulate matter deposited on said filter by using said temperature raising unit after the controller has caused the particulate matter to move to said downstream side portion of said filter.

The exhaust gas shut-off valve is caused to be fully opened at the time of normal operation of the internal combustion engine in which control of the exhaust flow by the controller is not carried out (hereinafter, this may also be referred to as simply "at the time of normal operation"). Then, at the time of normal operation, the exhaust gas discharged from the internal combustion engine flows with pulsation in the exhaust passage from its upstream side to its downstream side. In the following explanation, a flow from the upstream side to the downstream side in the flow of exhaust gas is referred to as a "forward flow", and a flow from the downstream side to the upstream side is referred to as a "backward flow". Here, when the controller temporarily controls the exhaust gas shut-off valve to the fully closed state, the flow of exhaust gas in the exhaust passage may temporarily flow backwards, or the magnitude of pulsation may temporarily increase even though the flow of exhaust gas remains the same, i.e., the forward flow. Then, when the flow of exhaust gas in the exhaust passage changes to a relatively large extent in this manner, the flow of exhaust gas in the filter may also change.

Here, when attention is focused on the deposition state of PM in the partition walls of the filter, at the time of normal operation, the exhaust gas tends to flow from one surface side of each partition wall to the other surface side thereof, passing through the interior of each partition wall, and hence, PM becomes apt to deposit on the one surface and the interior of each partition wall. On the other hand, when the controller temporarily controls the exhaust gas shut-off valve to the fully closed state, the flow of exhaust gas in the filter may change. Specifically, if the flow of exhaust gas in the exhaust passage temporarily flows backwards by said control, the exhaust gas passing through the partition walls temporarily flows in the opposite direction with respect to that at the time of normal operation (i.e., in a direction from said other surface side to said one surface side of each partition wall). In addition, if the magnitude of pulsation temporarily increases with the flow of exhaust gas remaining the forward flow, too, the exhaust gas passing through the partition walls may temporarily flow in the opposite direction with respect to that at the time of normal operation. That is because under the influence of the pulsation of which the magnitude has increased, the pressure at the side of said one surface of each partition wall may become lower than the pressure at the side of said other surface of each partition wall, so a disturbance will be apt to occur in the flow of exhaust gas in the filter. Then, when there occurs a disturbance in the flow of exhaust gas in the filter in which the exhaust gas passing through the partition walls temporarily flows in the opposite direction to that at the time of normal operation, the PM deposited on the partition walls becomes apt to exfoliate from the partition walls.

At the time of normal operation, the PM tends to deposit on a portion in the filter at the downstream side (hereinafter, sometimes referred to as a "downstream side portion of the filter") more easily when the flow rate of the exhaust gas is large than when it is small. By making use of this tendency, the controller can cause the PM exfoliated from the partition walls to move to the downstream side portion of the filter, by temporarily controlling the exhaust gas shut-off valve to the fully closed state. This will be explained below. As mentioned above, when the exhaust gas shut-off valve is temporarily controlled to the fully closed state, a disturbance of the flow of exhaust gas in the filter becomes apt to occur in which the exhaust gas passing through the partition walls temporarily flows in the opposite direction with respect to that at the time of normal operation. Here, when such a disturbance remains occurred in the flow of exhaust gas in the filter, it becomes hard to cause the PM exfoliated from the partition walls to deposit on a desired portion of the filter. Accordingly, the controller causes the flow in the filter, in which a backward flow has occurred locally, to return to the forward flow by controlling the exhaust gas shut-off valve in the fully closed state to the fully opened state. Specifically, when the flow rate of the exhaust gas is equal to or more than the predetermined flow rate, the controller causes the forward flow, which is equal to or more than the predetermined flow rate, to occur in the filter by carrying out control of the exhaust gas shut-off valve. As a result, the PM exfoliated will be moved to the downstream side portion of the filter. Here, note that the predetermined flow rate is defined as a flow rate at which the PM exfoliated from the partition walls can be caused to move to the downstream side portion of the filter.

Then, after the controller has controlled the flow of exhaust gas in the filter to move the PM to the downstream side portion of the filter, the regeneration of the filter is carried out by the regeneration processing being performed by the controller. As mentioned above, the regeneration processing is carried out with the use of the temperature raising unit, so in the regeneration processing, the temperature of the filter will be raised from its downstream side, i.e., the side thereof at which the PM moved by the control of the flow of exhaust gas has been intensively deposited. Thus, in the case of oxidizing and removing the PM intensively deposited on the downstream side portion of the filter, the PM becomes easy to burn continuously. Here, note that as the temperature raising unit, there can be used a well-known construction such as an electric heating device, etc.

In the regeneration of the filter as mentioned above, the regeneration of the filter can be carried out with small energy in a short period of time. In other words, the exhaust gas purification apparatus for an internal combustion engine according to the present disclosure makes it possible to oxidize and remove the PM deposited in the filter in a suitable manner.

In addition, said filter may be an SCR filter in which an NOx selective catalytic reduction catalyst is supported by said partition walls. Here, the NOx selective catalytic reduction catalyst tends to become easy to deteriorate when exposed to a temperature at which the PM can be oxidized and removed. Accordingly, the SCR filter according to the present disclosure is characterized in that said NOx selective catalytic reduction catalyst is supported at the upstream side of a predetermined downstream side portion in said filter in the direction of flow of exhaust gas. Here, said predetermined portion is a portion in which the PM moved by the control of the flow of exhaust gas intensively deposits. In the regeneration of the filter by means of the above-mentioned regeneration processing, such a predetermined portion at the downstream side becomes easy to be raised in temperature. That is, during the execution of the regeneration processing, the portion of the filter at the upstream side in which the NOx selective catalytic reduction catalyst is supported has a tendency to become lower in temperature than said predetermined portion. In other words, in the case of the oxidation removal of the PM, there hardly occurs a situation where the NOx selective catalytic reduction catalyst is exposed to a temperature at which the NOx selective catalytic reduction catalyst may deteriorate.

In the regeneration of the filter in such an SCR filter, the regeneration of the filter can be carried out with small energy in a short period of time, and at the same time, the deterioration of the NOx selective catalytic reduction catalyst accompanying the regeneration of the filter is suppressed. Accordingly, the PM deposited in the filter can be oxidized and removed in a suitable manner.

Moreover, said controller may carry out said regeneration processing during stop of said internal combustion engine. In this case, the processing by the controller is carried out during the operation of the internal combustion engine, and thereafter, when the internal combustion engine is stopped, the regeneration processing will be carried out. In this manner, by carrying out the regeneration processing during stop of the internal combustion engine, it is possible to eliminate the influence of the regeneration processing on the reduction of NOx by the NOx selective catalytic reduction catalyst.

According to the present disclosure, it is possible to oxidize and remove particulate matter deposited in a filter of wall flow type in a suitable manner.

BRIEF DESCRIPTION OF DRAWINGS

FIG. 1 is a diagram showing the schematic construction of an internal combustion engine and its intake and exhaust systems according to a first embodiment of the present disclosure.

FIG. 2 is a longitudinal cross sectional view showing the schematic construction of a filter according to the present disclosure.

FIG. 3 is a transverse cross sectional view showing the schematic construction of the filter according to the present disclosure.

FIG. 4 is a flow chart showing a control flow for exhaust gas flow control according to the present disclosure.

FIG. 5A is a diagram showing the flow of exhaust gas passing through partition walls of the filter and the concept of behavior of particulate matter in the filter, when the flow of exhaust gas in an exhaust passage temporarily flows backwards.

FIG. 5B is a diagram showing the flow of exhaust gas passing through the partition walls of the filter and the concept of behavior of particulate matter in the filter, when the flow of exhaust gas in the exhaust passage remains a forward flow but the magnitude of pulsation thereof has temporarily increased.

FIG. 5C is a diagram showing a state where the particulate matter has been moved to a downstream side portion of, the filter by means of the exhaust gas flow control.

FIG. 6 is a first flow chart showing a control flow for processing to regenerate the filter according to the first embodiment of the present disclosure.

FIG. 7 is a graph showing the relation between a filter rear end side temperature and a period of time of energization.

FIG. 8 is a diagram showing the schematic construction of an internal combustion engine and its intake and exhaust systems according to a second embodiment of the present disclosure.

FIG. 9 is a second flow chart showing a control flow for processing to regenerate a filter according to the second embodiment of the present disclosure.

FIG. 10 is a diagram showing the schematic construction of an internal combustion engine and its intake and exhaust systems according to a modification of the second embodiment of the present disclosure.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless particularly stated.

First Embodiment

Hereinafter, a first embodiment of the present disclosure will be explained by using the attached drawings. FIG. 1 is a diagram showing the schematic construction of an internal combustion engine and its intake and exhaust systems according to the first embodiment of the present disclosure. The internal combustion engine 1 shown in FIG. 1 is an internal combustion engine of compression ignition type (diesel engine) using light oil as fuel. However, the present disclosure can also be applied to an internal combustion engine of spark ignition type which uses gasoline or the like as fuel.

The internal combustion engine 1 is provided with a fuel injection valve 3 for injecting fuel into a cylinder 2. Here, note that if the internal combustion engine 1 is an internal combustion engine of spark ignition type, the fuel injection valve 3 may be constructed such that fuel is injected to an intake port.

The internal combustion engine 1 is connected to an intake passage 4. In the intake passage 4, there are arranged an air flow meter 40 and a throttle valve 41. The air flow meter 40 is a sensor that outputs an electrical signal corresponding to an amount (mass) of intake air (air) flowing in the intake passage 4. The throttle valve 41 is arranged in the intake passage 4 at the downstream side of the air flow meter 40. The throttle valve 41 serves to adjust the amount of intake air in the internal combustion engine 1 by changing the channel cross section of the intake passage 4.

The internal combustion engine 1 is connected to an exhaust passage 5. A filter case 50, a first temperature sensor 55, a urea water addition valve 54, a catalyst case 51, an NOx sensor 56, and an exhaust gas shut-off valve 53 are arranged in the exhaust passage 5 sequentially according to the flow of exhaust gas. The filter case 50 has a particulate filter 50a (hereinafter, sometimes referred to as a "filter 50a") received in a substantially cylindrical casing. In addition, the filter case 50 has an electric heating device 52 received therein at the downstream side of the filter 50a. The filter 50a is a filter of wall flow type, and its substrate has a porous body, in order to trap particulate matter in the exhaust gas. Here, note that the details of the filter 50a will be described later. Moreover, the electric heating device 52 in this embodiment is a heating wire heater. By electrically energizing this heating wire heater, the temperature of the filter 50a can be raised from a downstream side thereof. Here, for this purpose, any well-known construction can be employed which can raise the temperature of the filter 50a from its downstream side in this manner, and for example, there may be used a construction which can generate heat by application of voltage utilizing the substrate of the filter 50a as resistance. Here, note that in this embodiment, the electric heating device 52 corresponds to a temperature raising unit in the present disclosure.

In addition, the catalyst case 51 has an NOx selective catalytic reduction catalyst 51a (hereinafter, sometimes referred to an "SCR catalyst 51a") received in the substantially cylindrical casing. The SCR catalyst 51a has a function to reduce NOx in the exhaust gas by using ammonia as a reducing agent. Here, the urea water addition valve 54 arranged at the upstream side of the SCR catalyst 51a serves to add urea water into the exhaust gas flowing in the exhaust passage 5, and the urea water thus added is supplied to the SCR catalyst 51a. In other words, urea, which is a precursor of ammonia, is supplied to the SCR catalyst 51a. Then, ammonia produced by the hydrolyzation of the urea thus supplied adsorbs to the SCR catalyst 51a. The NOx in the exhaust gas is reduced by using this ammonia adsorbed to the SCR catalyst 51a as a reducing agent. Here, note that in place of the urea water addition valve 54, there may be arranged an ammonia addition valve that serves to add ammonia gas into the exhaust gas.

Moreover, the first temperature sensor 55 outputs an electrical signal corresponding to the temperature of the exhaust gas, and the NOx sensor 56 outputs an electrical signal corresponding to the concentration of NOx in the exhaust gas. In addition, the exhaust gas shut-off valve 53 is constructed so that it is switched over between a fully opened state and a fully closed state. Here, note that even if the exhaust gas shut-off valve 53 is in the fully closed state under control, a relatively small amount of exhaust gas can flow into a portion of the exhaust passage 5 at the downstream side of the exhaust gas shut-off valve 53 due to a structural reason.

Then, in the internal combustion engine 1, there is provided an electronic control unit (ECU) 10 in combination therewith. This ECU 10 is a unit that controls an operating state of the internal combustion engine 1, etc. A variety of kinds of sensors such as an accelerator position sensor 7, a crank position sensor 8, etc., in addition to the air flow meter 40, the first temperature sensor 55 and the NOx sensor 56 mentioned above are electrically connected to the ECU 10. The accelerator position sensor 7 is a sensor which outputs an electrical signal correlated with an amount of operation (accelerator opening) of an unillustrated accelerator pedal. The crank position sensor 8 is a sensor which outputs an electrical signal correlated with the rotational position of an engine output shaft (crankshaft) of the internal combustion engine 1. The output signals of these sensors are inputted to the ECU 10. The ECU 10 derives the engine load of the internal combustion engine 1 based on the output signal of the accelerator position sensor 7, and also derives the engine rotational speed of the internal combustion engine 1 based on the output value of the crank position sensor 8. In addition, the ECU 10 estimates the flow rate of the exhaust gas discharged from the internal combustion engine 1 (hereinafter, sometimes referred to as the "flow rate of the exhaust gas") based on the output value of the air flow meter 40.

In addition, a variety of kinds of equipment such as the fuel injection valve 3, the throttle valve 41, the electric heating device 52, the exhaust gas shut-off valve 53, the urea water addition valve 54 and so on are electrically connected to the ECU 10. Then, the ECU 10 controls these various kinds of equipment. For example, the ECU 10 can raise the temperature of the filter 50a from its downstream side, by operating the electric heating device 52. Then, in the filter 50a, the PM trapped by the substrate burns in a portion thereof of which the temperature has become equal to or more than a predetermined temperature (e.g., 600 degrees C.).

Next, the structure of the filter 50a will be explained based on FIG. 2 and FIG. 3. FIG. 2 is a longitudinal cross sectional view showing the schematic construction of the filter 50a, and FIG. 3 is a transverse cross sectional view showing the schematic construction of the filter 50a. As shown in FIG. 2 and FIG. 3, a substrate 510 of a cylindrical shape, which constitutes the filter 50a, is received in the filter case 50. In the substrate 510, there are formed a plurality of passages 511, 512 extending in an axial direction (i.e., in a direction of flow of exhaust gas), and at the same time, these plurality of passages 511, 512 are arranged in a honeycomb shape. In other words, the substrate 510 is formed in such a manner as to define the plurality of passages 511, 512 arranged in the honeycomb shape. Here, note that the number of the passages 511, 512 shown in FIGS. 2 and 3 is merely an example, and the number of these passages 511, 512 should just be suitably decided according to the specifications of a vehicle and the internal combustion engine 1 mounted thereon.

Among the plurality of passages 511, 512, the passages 511 are each closed by a plug body 513 at its upstream side end portion in the direction of flow of exhaust gas. The remaining passages 512 among the plurality of passages 511, 512 are each closed by a plug body 514 at its downstream side end portion in the direction of flow of exhaust gas. Here, note that the passages 511 and the passages 512 are arranged in an alternate manner. With this, the filter of wall flow type is formed. Hereinafter, the passages 511 are referred to as first passages 511, and the passages 512 are referred to as second passages 512.

In the substrate 510, partition walls 515 located between the first passages 511 and the second passages 512 are each formed of a porous body. Here, note that only the partition walls 515 of the substrate 510 may be each formed of a porous body, or the entire substrate 510 including the plug bodies 513, 514 may be each formed of a porous body. As a material for the porous body referred to herein, there can be adopted a well-known material which is suitable for trapping the particulate matter (PM) in the exhaust gas.

Then, by means of such a filter 50a, the PM in the exhaust gas is trapped, and the PM thus trapped deposits on the substrate 510. As the PM increasingly deposits on the filter 50a in this manner, the pressure loss of the filter 50a will increase, so the regeneration of the filter 50a is carried out by raising the temperature of the filter 50a thereby to oxidize and remove the PM. Here, the PM tends to deposit in the filter 50a from its upstream side portion to its downstream side portion. Accordingly, in order to oxidize and remove the PM deposited on the filter 50a, it is necessary to raise the temperature of the filter 50a over a wide area or range from its upstream side portion to its downstream side portion, and a large amount of energy will be required for the regeneration of the filter 50a. On the other hand, in such a filter 50a, if the PM can be made to deposit intensively on a certain part of the filter 50a, the filter 50a can be regenerated with smaller energy in a shorter period of time, by raising the temperature of that part on which the PM has intensively deposited, than in the case where the temperature of the entire filter 50a is raised.

Accordingly, when the flow rate of the exhaust gas is equal to or larger than a predetermined flow rate, the ECU 10 controls the flow of exhaust gas in the filter 50a by once fully closing said exhaust gas shut-off valve 53 and then fully opening it, thereby causing the PM deposited on the filter 50a to move to the downstream side portion in the filter 50a (hereinafter, sometimes referred to as the "downstream side portion of the filter"). Thus, the control of the flow of exhaust gas, which is carried out for causing the PM to move to the downstream side portion of the filter, is referred to as "exhaust gas flow control". Here, note that the ECU 10 functions as a controller according to the present disclosure by carrying out the exhaust gas flow control.

Here, a control flow for the exhaust gas flow control carried out by the ECU 10 will be explained based on FIG. 4. FIG. 4 is a flow chart showing the control flow for the exhaust gas flow control. In this embodiment, this flow is carried out at a predetermined operation interval in a repeated manner by the ECU 10 during the operation of the internal combustion engine 1. In other words, the exhaust gas flow control will be carried out irrespective of whether a request for regeneration of the filter 50a is satisfied.

In this flow, first, in step S101, it is determined whether fuel cut processing is in execution. Then, if an affirmative determination is made in step S101, the ECU 10 goes to the processing of step S102, whereas if a negative determination is made in step S101, the execution of this flow is terminated. If the exhaust gas flow control is carried out when fuel cut processing is not in execution, the back pressure of the internal combustion engine 1 may change due to the influence of the exhaust gas shut-off valve 53 temporarily closed, and combustion within the cylinder 2, etc., may be affected. For that reason, in this flow, when fuel cut processing is not in execution, the exhaust gas flow control is not carried out. However, it is not intended that the exhaust gas flow control be limited to being carried out only in the execution of fuel cut processing. when there is no adverse effect on the operation of the internal combustion engine 1 even if the ECU 10 carries out the control of the exhaust gas shut-off valve 53, the ECU 10 can carry out that control even when fuel cut processing is not in execution. In this case, in step S101, instead of determining whether fuel cut processing is in execution, it is determined whether there is no adverse effect on the operation of the internal combustion engine 1 even if the control of the exhaust gas shut-off valve 53 is carried out.

When an affirmative determination is made in step S101, then in step S102, the flow rate of exhaust gas Fre is calculated. In step S102, the flow rate of exhaust gas Fre is calculated based on the output value of the air flow meter 40. Here, note that because the processing of step S102 is carried out during the execution of fuel cut processing, the flow rate of exhaust gas Fre calculated in step S102 is the flow rate of air discharged from the internal combustion engine 1. Then, in step S103, it is determined whether the flow rate of exhaust gas Fre calculated in step S102 is equal to or higher than a predetermined threshold value Freth. Here, the predetermined threshold value Freth is defined as a flow rate at which the PM, which has been exfoliated from the partition walls 515 of the filter 50a by the processing of step S104 to be described later, can be caused to move to the downstream side portion of the filter by the processing of step S105 to be described later. Here, note that the predetermined threshold value Freth corresponds to a predetermined flow rate in the present disclosure. Then, if an affirmative determination is made in step S103, the ECU 10 goes to the processing of step S104, whereas if a negative determination is made in step S103, the execution of this flow is terminated.

When an affirmative determination is made in step S103, then in step S104, processing to control the exhaust gas shut-off valve 53 of the fully opened state to the fully closed state is carried out. As a result, a temporary disturbance occurs in the flow of exhaust gas in the filter 50a, and the PM deposited on the partition walls 515 exfoliates. This will be explained below by the use of FIG. 5A and FIG. 5B. FIG. 5A is a diagram showing the flow of exhaust gas passing through the partition walls 515 of the filter 50a and the concept of behavior of the particulate matter (PM) in the filter 50a, when the flow of exhaust gas in the exhaust passage 5 temporarily flows backwards due to the processing of step S104. As shown in FIG. 5A, when the flow of exhaust gas in the exhaust passage 5 flows backwards, a temporary disturbance will occur in the flow of exhaust gas in the filter 50a, so the exhaust gas passing through the partition walls 515 flows in a direction opposite to that at the time of normal operation of the internal combustion engine 1 in which the exhaust gas flow control is not carried out (hereinafter, this may also be referred to simply as "at the time of normal operation"). As a result, the PM exfoliates from the partition walls 515.

Moreover, FIG. 5B is a diagram showing the flow of exhaust gas passing through the partition walls 515 of the filter 50a and the concept of behavior of the particulate matter (PM) in the filter 50a, when the flow of exhaust gas in the exhaust passage 5 remains the forward flow but the magnitude of pulsation thereof has temporarily increased due to the processing of step S104. When the flow of exhaust gas in the exhaust passage 5 remains the forward flow but the magnitude of pulsation thereof has temporarily increased, a temporary disturbance will occur in the flow of exhaust gas in the filter 50a, so the exhaust gas passing through the partition walls 515 flows in both of the forward and backward directions, as shown in FIG. 5B. This is because there are two cases; one case is that the pressure in the second passages 512 becomes larger than that in the first passages 511 under the influence of the pulsation of which the magnitude has increased (in this case, the exhaust gas passing through the partition walls 515 flows in the forward direction), and the other case is that the pressure in the second passages 512 becomes smaller than that in the first passages 511 (in this case, the exhaust gas passing through the partition walls 515 flows in the backward direction). Then, when the exhaust gas passing through the partition walls 515 flows in the backward direction due to the disturbance in the flow of exhaust gas which has temporarily occurred in the filter 50a, the PM exfoliates from the partition walls 515.

Then, in step S105 after the processing of step S104, processing to control the exhaust gas shut-off valve 53 of the fully closed state to the fully opened state is carried out. As a result, the flow in the filter 50a, in which a backward flow locally occurred, returns to the forward flow, and the PM exfoliated by the processing of step S104 moves to the downstream side portion of the filter. Then, after the processing of step S105, the execution of this flow is ended. Here, note that the processing of step S105 is carried out at a timing at which the PM exfoliated from the partition walls 515 by the processing of step S104 can be caused to move to the downstream side portion of the filter. For example, the processing of step S105 may be carried out after the lapse of a predetermined period of time from the processing of step S104, or may be carried out immediately after the exhaust gas shut-off valve 53 has been put into the fully closed state by the processing of step S104.

FIG. 5C is a diagram showing a state where the particulate matter has been moved to the downstream side portion of the filter by the processing of step S105. By the exhaust gas flow control which is represented by the above-mentioned processings of steps S101 to S105 and which is carried out by the ECU 10, PM deposits intensively on the downstream side portion of the filter (i.e., at the downstream side of a line L1 indicated by a broken line), as shown in FIG. 5C.

Thus, by means of the above-mentioned exhaust gas flow control, PM can be caused to deposit intensively on the downstream side portion of the filter. For that reason, by raising the temperature of the downstream side portion, the regeneration of the filter 50a can be carried out with smaller energy in a shorter period of time, than in the case where the temperature of the filter 50a as a whole is raised. Accordingly, the ECU 10 can raise the temperature of the filter 50a from its downstream side, by operating the electric heating device 52. With this, the PM intensively deposited on the downstream side portion of the filter is oxidized and removed, whereby the filter 50a is regenerated. Here, note that the ECU 10 functions as a controller according to the present disclosure by carrying out the processing to regenerate the filter 50a in this manner.

Here, a control flow for the regeneration of the filter 50a carried out by the ECU 10 will be explained based on FIG. 6. FIG. 6 is a flow chart showing the control flow for the processing to regenerate the filter 50a. In this embodiment, this flow is carried out at a predetermined operation interval in a repeated manner by the ECU 10 during the operation of the internal combustion engine 1.

In this flow, first in step S111, it is determined whether the request for regeneration of the filter 50a is satisfied. Here, the request for regeneration of the filter 50a is satisfied, for example, if it is estimated that an amount of PM equal to or more than a predetermined amount has deposited on the filter 50a. In this case, the estimation of the amount of PM deposition is carried out according to a well-known flow which is different from this flow. Then, if an affirmative determination is made in step S111, the ECU 10 goes to the processing of step S112, whereas if a negative determination is made in step S111, the execution of this flow is terminated.

When an affirmative determination is made in step S111, then in step S112, it is determined whether an execution condition for carrying out the regeneration of the filter 50a is satisfied. As mentioned above, the electric heating device 52 raises the temperature of the filter 50a from its downstream side. Accordingly, when the PM is supposed not to be intensively deposited on the downstream side portion of the filter, even if the electric heating device 52 is operated, the PM can not be sufficiently oxidized and removed from the filter 50a. Accordingly, the ECU 10 estimates whether the PM has intensively deposited on the downstream side portion of the filter. Then, if it is estimated that the PM has intensively deposited on the downstream side portion of the filter, in step S112, a determination is made that the execution condition for carrying out the regeneration of the filter 50a is satisfied. For example, if the exhaust gas flow control has been carried out until the present time after the filter 50a was regenerated the last time, the PM will intensively deposit on the downstream side portion of the filter by means of the exhaust gas flow control, and hence, the execution condition for carrying out the regeneration of the filter 50a is assumed to be satisfied, and in step S112, an affirmative determination is made. Then, if an affirmative determination is made in step S112, the ECU 10 goes to the processing of step S113, whereas if a negative determination is made in step S112, the execution of this flow is terminated.

When an affirmative determination is made in step S112, then in step S113, a filter rear end side temperature Tcrr is calculated. The filter rear end side temperature Tcrr represents an estimated temperature of the downstream side portion of the filter, and is calculated based on the output value of the first temperature sensor 55. Specifically, the correlation between the filter rear end side temperature Tcrr and the output value of the first temperature sensor 55 has been stored in advance in a ROM of the ECU 10 as a map or a function, and in step S113, the filter rear end side temperature Tcrr is calculated based on the map or function, and the output value of the first temperature sensor 55.

Subsequently, in step S114, a period of time of energization Tmeh to the electric heating device 52 is calculated. Here, the period of time of energization Tmeh is defined as a period of time of energization to the electric heating device 52 in which, on the assumption that the PM has intensively deposited on the downstream side portion of the filter, the PM in such a state can be oxidized and removed. It is to be noted that in the case where the density of deposition of the PM in the filter 50a is high, there is a more tendency for the PM to burn continuously at the time of the regeneration of the filter 50a, than in the case where the density of deposition of the PM is low, so the period of time of energization Tmeh defined as mentioned above becomes relatively short. In addition, in the filter 50a, the PM trapped by the substrate begins to burn in a portion thereof of which the temperature has become equal to or more than the predetermined temperature (e.g., 600 degrees C.). Accordingly, the period of time of energization Tmeh is calculated as an operating time of the electric heating device 52 in which the temperature of the downstream side portion of the filter can be made equal to or higher than the predetermined temperature. Here, the correlation between the filter rear end side temperature Tcrr and the period of time of energization Tmeh is shown in FIG. 7. The higher the filter rear end side temperature Tcrr, the shorter the period of time of energization Tmeh is made, as shown in FIG. 7. In step S114, the period of time of energization Tmeh is calculated based on the filter rear end side temperature Tcrr calculated in step S113, and a map or function which has been stored in the ROM of the ECU 10, and which represents the correlation between the filter rear end side temperature Tcrr and the period of time of energization Tmeh.

Subsequently, in step S115, electrical energization to the electric heating device 52 is started. This starts the operation of the electric heating device 52, so that the temperature of the filter 50a is raised from its downstream side. Then, in step S116, it is determined whether the period of time of energization Tmeh has elapsed after the electrical energization to the electric heating device 52 has been started. If an affirmative determination is made in step S116, namely when it is estimated that the temperature of the downstream side portion of the filter is equal to or higher than the predetermined temperature, the ECU 10 goes to the processing of step S117. Here, note that when the temperature of the downstream side portion of the filter becomes equal to or higher than the predetermined temperature, the PM deposited in that portion begins to burn. Then, the PM burns continuously. As a result, the PM is oxidized and removed from the filter 50a. On the other hand, if a negative determination is made in step S116, the ECU 10 returns to the processing of step S115, and in the step S115, the electrical energization to the electric heating device 52 is continued.

When an affirmative determination is made in step S116, then in step S117, the electrical energization to the electrical heating device and 52 is terminated. Then, after the processing of step S117, the execution of this flow is ended. Here, note that the ECU 10 may further calculate the filter rear end side temperature Tcrr after the processing of step S117. With this, it can be confirmed that the temperature of the downstream side portion of the filter has gone up to a sufficient extent. Here, if the filter rear end side temperature Tcrr is supposed to be lower than a predetermined lower limit temperature, the ECU 10 can decide that the temperature of the downstream side portion of the filter has not yet reached the predetermined temperature at which the PM may be oxidized and removed for a certain reason, and can resume electrical energization to the electric heating device 52.

As stated above, the ECU 10 can regenerate the filter 50a with small energy in a short time, by carrying out the exhaust gas flow control thereby to move the PM to the downstream side portion of the filter, and further, by raising the temperature of the downstream side portion with the use of the electric heating device 52. In other words, the exhaust gas purification apparatus for an internal combustion engine according to the present disclosure makes it possible to oxidize and remove the PM deposited in the filter 50a in a suitable manner.

Second Embodiment

Next, a second embodiment of the present disclosure will be described. FIG. 8 is a diagram showing the schematic construction of an internal combustion engine and its intake and exhaust systems according to the second embodiment of the present disclosure. The internal combustion engine 1 shown in FIG. 8 is an internal combustion engine of compression ignition type (diesel engine) using light oil as fuel. However, the present disclosure can also be applied to an internal combustion engine of spark ignition type which uses gasoline or the like as fuel. Here, note that in this second embodiment, the detailed explanation of substantially the same construction and substantially the same control processing as in the above-mentioned first embodiment is omitted.

In an exhaust passage 5 of the internal combustion engine 1, there are arranged a urea water addition valve 54, a filter case 50, a first temperature sensor 55, an NOx sensor 56, and an exhaust gas shut-off valve 53 in order according to the flow of exhaust gas. The filter case 50 has an SCR filter 50b received in a substantially cylindrical casing. In addition, the filter case 50 has an electric heating device 52 received therein at the downstream side of the SCR filter 50b. The SCR filter 50b is constructed in such a manner that an SCR catalyst 51a is carried or supported by a filter of wall flow type formed of a porous substrate. Here, the filter has a function to trap PM (particulate matter) contained in the exhaust gas. Moreover, the SCR catalyst 51a has a function to reduce NOx in the exhaust gas by using ammonia as a reducing agent. For that reason, the SCR filter 50b has the PM trapping function and the NOx reduction function. Here, in this second embodiment, as shown in FIG. 8, the SCR catalyst 51a is supported by an upstream side portion in the direction of flow of exhaust gas in the SCR filter 50b. Thus, it is preferable that the upstream side portion by which the SCR catalyst 51a is supported be at the upstream side of a line L1 away to some extent therefrom, so that it is at least at the upstream side of the line L1 indicated by a broken line shown in the above-mentioned FIG. 5C (as mentioned above, the PM has intensively deposited at the downstream side of the line L1), and the transfer of heat produced by the burning of the PM to the SCR catalyst 51a is alleviated to some extent.

In such an exhaust gas purification apparatus, too, the ECU 10 carries out exhaust gas flow control, as in the case of the above-mentioned first embodiment. Then, when the ECU 10 carries out the exhaust gas flow control, the PM deposited on the SCR filter 50b will move to the downstream side portion of the SCR filter 50b, and the PM will intensively deposit on the downstream side portion.

Then, the ECU 10 regenerates the SCR filter 50b, similar to the above-mentioned first embodiment. Specifically, by raising the temperature of the downstream side portion of the SCR filter 50b with the use of the electric heating device 52, the PM intensively deposited on the downstream side portion is oxidized and removed. This makes it possible to carry out the regeneration of the SCR filter 50b with small energy in a short time.

Here, in this second embodiment, at the time of the oxidation and removal of the PM, the upstream side portion in the SCR filter 50b by which the SCR catalyst 51a is supported tends to become lower in temperature than the downstream side portion in the SCR filter 50b. In other words, at the time of the oxidation and removal of the PM, there will hardly occur a situation where the SCR catalyst 51a is exposed to temperatures at which the SCR catalyst 51a may deteriorate. As a result, the deterioration of the SCR catalyst 51a accompanying the regeneration of the SCR filter 50b is suppressed. Thus, in the construction of this second embodiment, too, the exhaust gas purification apparatus for an internal combustion engine according to the present disclosure makes it possible to oxidize and remove the PM deposited in the SCR filter 50b in a suitable manner.

In addition, the ECU 10 carries out the exhaust gas flow control during the operation of the internal combustion engine 1, and after that, when the internal combustion engine 1 is stopped, the regeneration of the SCR filter 50b may be carried out. Here, note that "during the operation of the internal combustion engine 1" represents a state where ignition is not off, and the execution of the above-mentioned fuel cut processing is included in "during the operation of the internal combustion engine 1". A control flow for such regeneration of the SCR filter 50b carried out by the ECU 10 will be explained based on FIG. 9. FIG. 9 is a flow chart showing the control flow for the processing to regenerate the SCR filter 50b.

In this flow shown in FIG. 9, similar to that shown in the above-mentioned FIG. 6, in step S111, it is determined whether a request for regeneration of the SCR filter 50b is satisfied. This processing of step S111 is repeatedly carried out at a predetermined operation interval during the operation of the internal combustion engine 1. Thereafter, if an affirmative determination is made in step S111, then in step S211, it is determined whether the internal combustion engine 1 has been stopped. Then, if an affirmative determination is made in step S211, the ECU 10 goes to the processing of step S112, whereas if a negative determination is made in step S211, the ECU 10 repeats the processing of step S211 at a predetermined interval. Here, note that while the ECU 10 repeats the processing of S211 at the predetermined interval, the ECU 10 continues the processing of step S211 with priority, even if the next execution timing of this flow comes.

In this manner, in the flow shown in FIG. 9, the regeneration of the SCR filter 50b is carried out during the stop of the internal combustion engine 1. Here, the urea water from the urea water addition valve 54 tends to be oxidized to form NOx at high temperature, but during the stop of the internal combustion engine 1, the urea water is not supplied from the urea water addition valve 54, so if the regeneration of the SCR filter 50b is carried out during the stop of the internal combustion engine 1, the formation of NOx from the urea water is suppressed. In other words, by carrying out the regeneration of the SCR filter 50b during the stop of the internal combustion engine 1, it is possible to eliminate the influence of the regeneration processing on the reduction of NOx by the SCR catalyst 51a.

Modification of the Second Embodiment

Now, reference will be made to a modification of the above-mentioned second embodiment. FIG. 10 is a diagram showing the schematic construction of an internal combustion engine and its intake and exhaust systems according to this modification. Here, note that in this modification, the detailed explanation of substantially the same construction and substantially the same control processing as in the above-mentioned second embodiment is omitted.

In an exhaust passage 5 of an internal combustion engine 1 according to this modification, at the upstream side of a filter case 50, there are arranged an air supply valve 61 and a second temperature sensor 62 in addition to a urea water addition valve 54. The air supply valve 61 is connected to an unillustrated pump, and supplies air into the exhaust passage 5. Here, in the air supply valve 61, the arrangement thereof, the amount of supply and the supply pressure of air from the air supply valve 61, etc., are decided in such a manner that even if the internal combustion engine 1 has been stopped, a flow of air from the upstream side to the downstream side can be generated in the SCR filter 50b.

In such an exhaust gas purification apparatus, too, the ECU 10 carries out exhaust gas flow control, as in the case of the above-mentioned first embodiment. Then, when the ECU 10 carries out the exhaust gas flow control, the PM deposited on the SCR filter 50b will move to the downstream side portion of the SCR filter 50b, and the PM will intensively deposit on the downstream side portion.

Then, the ECU 10 can carry out the regeneration of the SCR filter 50b during the stop of the internal combustion engine 1, similar to the above-mentioned second embodiment. Here, in the regeneration of the SCR filter 50b, there may occur a situation in which the temperature of the SCR filter 50b rises to an excessive extent. Thus, if the temperature of the SCR filter 50b is supposed to have risen to an excessive extent during the stop of the internal combustion engine 1, it will become difficult to cool the SCR filter 50b quickly. Accordingly, in cases where there is a fear that the temperature of the SCR filter 50b may rise to an excessive extent with the regeneration of the SCR filter 50b during the stop of the internal combustion engine 1, the ECU 10 causes a flow of air from the upstream side to the downstream side in the SCR filter 50b, by using the air supply valve 61. Here, the ECU 10 sets the amount of supply, the supply pressure, etc., of the air from the air supply valve 61 in such a manner that the SCR filter 50b can be cooled quickly. With this, in cases where the regeneration of the SCR filter 50b is carried out during the stop of the internal combustion engine 1, an excessive temperature rise of the SCR filter 50b can be suppressed in a suitable manner.

In addition, in the flow shown in the above-mentioned FIG. 9, the ECU 10 may further calculate the filter rear end side temperature Tcrr after the processing of step S117, in order to confirm that the temperature of the downstream side portion of the SCR filter 50b has risen to a sufficient extent, but there is no flow of exhaust gas during the stop of the internal combustion engine 1, so there is a fear that the filter rear end side temperature Tcrr may not be calculated in an accurate manner. Accordingly, at the time of calculating the filter rear end side temperature Tcrr after the processing of step S117, the ECU 10 may cause the flow of air from the upstream side to the downstream side in the SCR filter 50b by using the air supply valve 61. Here, note that in this case, the temperature of the air supplied from the air supply valve 61 to the SCR filter 50b is detected by the second temperature sensor 62. Then, the filter rear end side temperature Tcrr can be calculated based on the temperature of the air flowing into the SCR filter 50b detected by the second temperature sensor 62, the temperature of the air flowing out of the SCR filter 50b detected by the first temperature sensor 55, and a map or function which has been stored in the ROM of the ECU 10, and which represents the correlation between these temperatures and the filter rear end side temperature Tcrr.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust gas purification apparatus for an internal combustion engine comprising:
   a filter of wall flow type that is arranged in an exhaust passage of the internal combustion engine, and has a plurality of cells divided by partition walls extending along the direction of flow of exhaust gas, said plurality of cells including first cells that each have a closed end portion at a downstream side in the direction of flow of exhaust gas and an open end portion at an upstream side in the direction of flow of exhaust gas, and second cells that each have a closed end portion at the upstream side in the direction of flow of exhaust gas and an open end portion at the downstream side in the direction of flow of exhaust gas, wherein said first and second cells are arranged in an alternate manner;
   a temperature raising unit that is configured to raise the temperature of said filter from a downstream side thereof in the direction of flow of exhaust gas;
   an exhaust gas shut-off valve that is arranged in said exhaust passage at the downstream side of said filter and is constructed so as to be switched over between a fully opened state and a fully closed state; and
   a controller comprising at least one processor configured to:
   control a flow of exhaust gas in said filter by once fully closing said exhaust gas shut-off valve and then fully opening it, when a flow rate of the exhaust gas is equal to or larger than a predetermined flow rate, so that particulate matter deposited on said filter is caused to move to a downstream side portion in said filter in the direction of flow of exhaust gas; and
   carry out regeneration processing which oxidizes and removes the particulate matter deposited on said filter by using said temperature raising unit after the controller has caused the particulate matter to move to said downstream side portion of said filter.

2. The exhaust gas purification apparatus for an internal combustion engine according to claim 1, wherein
   said filter is an SCR filter in which an NOx selective catalytic reduction catalyst is supported by said partition walls, and said NOx selective catalytic reduction catalyst is supported at the upstream side of a predetermined downstream side portion in said filter in the direction of flow of exhaust gas.

3. The exhaust gas purification apparatus for an internal combustion engine according to claim 2, wherein
   said controller carries out said regeneration processing during stop of said internal combustion engine.

* * * * *